Aug. 29, 1950 T. E. FRAUENSHUH 2,520,631

RADIO TUNING SYSTEM

Filed May 29, 1944

Inventor

Thomas E. Frauenshuh

By Robert M. Dunning

Attorney

Patented Aug. 29, 1950

2,520,631

UNITED STATES PATENT OFFICE 2,520,631

RADIO TUNING SYSTEM

Thomas Eugene Frauenshuh, St. Paul, Minn.

Application May 29, 1944, Serial No. 537,808

9 Claims. (Cl. 250—40)

My invention relates to an improvement in radio tuning system, wherein it is desired to provide a tuning system which will act to change the tuning of the radio receiver from one station to another without the use of rotating knobs, push buttons, or the like.

In recent years it has become common practice to provide a push button mechanism by means of which a selected series of stations may be tuned in. In the usual system a series of push buttons are provided, each equipped with indicia designating a station of the selected group. As each button is actuated the corresponding station is automatically selected and the remaining stations excluded.

These push button radio tuning systems are simple to operate, but require a certain amount of effort to operate. On a small table radio receiving set, the operation of depressing one of the push buttons may shift the position of the entire set. Further it is necessary to see the indicia on the various buttons in order to select a desired station.

The object of the present invention is to produce a tuning system having an apparatus capable of tuning in a selected series of stations in a predetermined sequence, and requiring no push buttons or tuning knobs whatsoever. In order to tune in the next station of the sequence it is only necessary to contact with the fingers a certain predetermined area on the surface of the radio receiving set. Thus by merely placing a finger upon a selected area of the set one station of the selected group will be tuned out and the next successive station of the sequence tuned in.

The outstanding feature of the present invention resides in the fact that any desired station of a selected group may be tuned in by simply touching a predetermined portion of the surface of the radio receiver with the hand or fingers either in a manner to provide a single contact or by a plurality of consecutive contacts.

A feature of the present invention resides in the fact that a portion of the exterior surface of the radio receiving set cabinet is provided with adjacent electrically conductive strips. These strips may form a part of the grill work or decoration of the set and may be on one or more surfaces thereof. By contacting these adjacent strips with a portion of the body, electricity is allowed to flow between these strips operating to tune the radio receiver to a different station.

A further feature of the present invention lies in the provision of a means whereby the call letters of the station tuned in are indicated on the dial of the radio receiving set by projected light. As the selector switches within the set are moved from one position to another a drum is rotated therewith. A light is arranged to project upon the translucent dial the call letters of a station through a transparent or open portion of the drum.

A further feature of the present invention resides in the provision of a means whereby the call letters of a station being projected, automatically disappear from the dial while the receiver is contacted, and the call letters of the next station to be selected will appear on the dial when the hand is removed from the receiver. This arrangement prevents a constant flicker of light during the changing operation and prevents the visible movement of the projected letters during this operation.

A further feature of the present invention resides in the fact that a single contact between the exposed strips above described operates to change the selector switches from one station to the next consecutive station of the selected list. Thus the selector mechanism will not be continuously operated as long as continuous contact between adjacent strips exists.

My radio tuning system is particularly advantageous for operation by bed ridden or crippled persons who find difficulty in the manual operation of changing the tuning of the radio receiver. My tuning system is also particularly advantageous for use by persons who can not see the numbering on a dial, or the call letters on selector buttons without the aid of glasses. My system is also desirable for others, not only because of its simplicity, but also because of its novelty of operation.

These and other objects and novel features of my invention will be more clearly and fully set forth in the following specification and claims.

In the drawings forming a part of my specification:

Figures 1, 2, 3, 4:
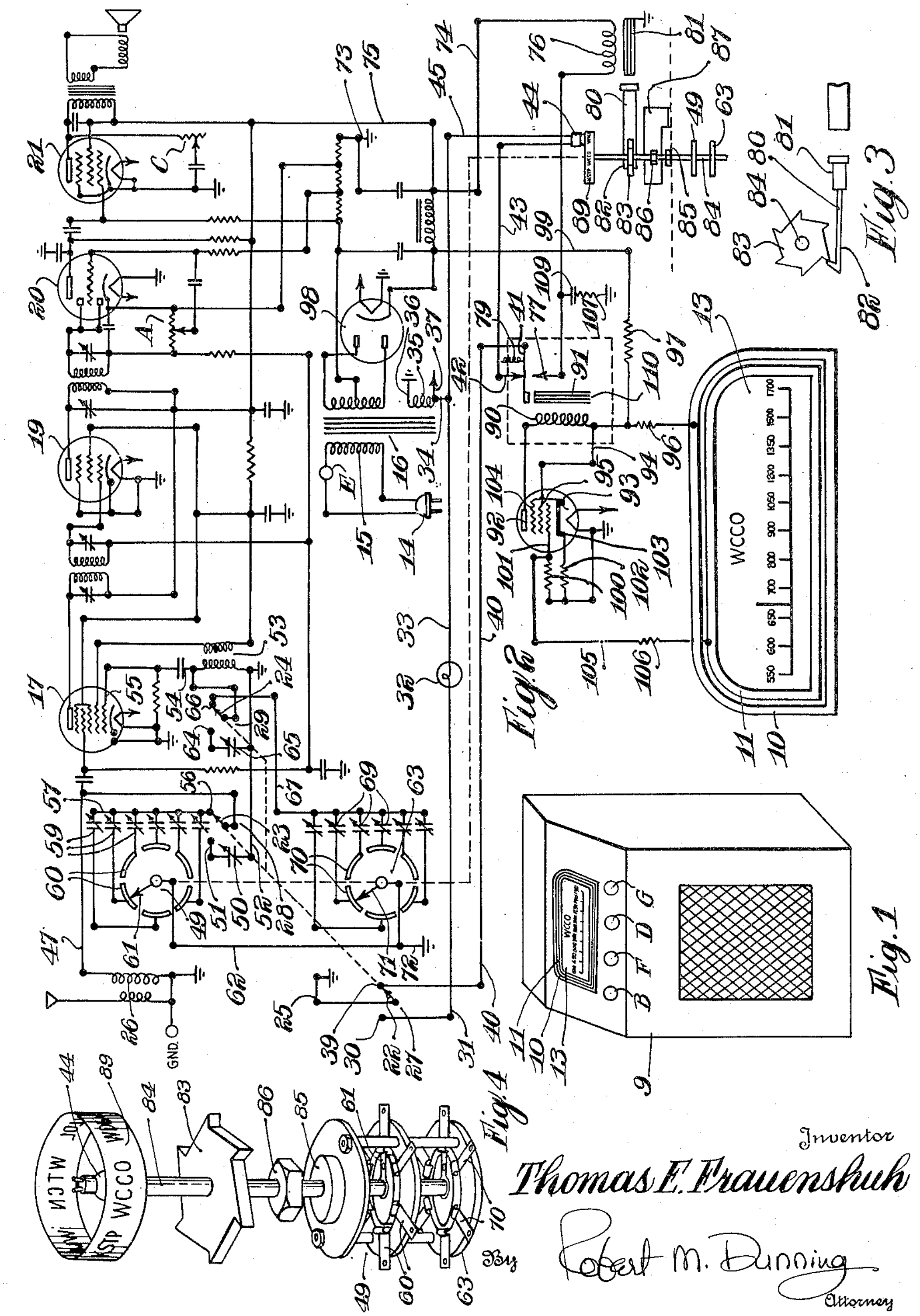
Figure 1 is a perspective view of a radio receiving set and cabinet embodying the principles of my invention.
Figure 2 is a wiring diagram illustrating in principle the manner of embodying my tuning system in a common type of radio receiver circuit.
Figure 3 is a diagram view illustrating the mechanism for changing the selector switches.
Figure 4 is a diagrammatic view of the light projecting apparatus and associated mechanism.

The radio receiving set cabinet 9 is similar in appearance to any set without push buttons and may be of any outward cabinet form or shape. In Figure 1, and diagrammatically in Figure 2, the control panel is provided with two closely spaced continuous metallic strips 10 and 11, which encircle the dial 13 of the radio receiver. The dial 13 is provided with translucent or transparent backing, upon which the call letters of a selected station may be projected in a manner which will be later described. The contact strips 10 and 11 may be of any desired shape or may extend on any desired insulating surface of the cabinet. These strips may form a part of the design of the radio receiving set or any essential part of the cabinet thereof (as long as the support is of insulating material), but are preferably rather close together for best operation. For example, metallic strips electrically spaced one-sixteenth of an inch apart have been found desirable.

Figure 2 of the drawings illustrates a conventional electrical diagram of a radio receiving set with the invention attached thereto. The set chosen for illustration is a simple superheterodyne with automatic volume control, and is equipped with a converter tube 17, an intermediate frequency amplifier tube 19, a detector amplifier tube 20, and a power output tube indicated at 21.

The volume control of the radio receiver is indicated in Figure 2 by the letter A. This is controlled by the control knob B of Figure 1. The radio tone control is indicated by the letter C in Figure 2 and is controlled by the knob D of Figure 1.

The power for operating the radio receiver is supplied through a suitable plug 14, the terminals of which are connected to the terminals of the primary coil 15 of the power transformer 16. The power passes through the on-off switch E which is actuated by the control knob B of Figure 1.

The electrical diagram of the automatic tuning unit, parts of which are my invention, is shown at the lower right of Figure 2 below the power supply of the radio. The electrical connections of the radio receiving set itself are not changed to accommodate the tuning unit. The tuning unit is therefore in effect added to the set, Figure 2 being shown in its entirety to illustrate how the various connections are made between the tuning unit and the radio receiving set. A mechanical change is made in the set, that being the substituting of the push button switches by rotary selector switches.

Electrically the stations are tuned in, in exactly the same manner as with push buttons, through the radio frequency selector switch and the oscillator switch, except that they are tuned in in sequence.

In order to change from manual to automatic tuning three switches 27, 28, and 29 are provided having three switch arms 22, 23, and 24. These switches are operable in unison and are movable between two positions. When the arms 22, 23, and 24 are in the position illustrated in the drawings, the dial light and manual tuning means are disconnected from the system and the automatic tuning unit is connected thereto. When these switch arms are turned to the other extreme posiion, the usual dial light is illuminated, the manual tuning means is electrically connected and the radio receiver operates in the usual manner entirely independent of the automatic tuning arrangement. The switches 27, 28 and 29 are attached to a common shaft, as indicated by the dotted line in Figure 2 between the switches, and are thus simultaneously operated by the knob F of Figure 1 of the drawings.

The switch arm 22 is electrically connected by conductor 25 to the radio receiver chassis. One terminal 30 of the switch 27 is connected by conductor 31 to a terminal of the conventional dial light 32, the other terminal of which is connected by conductor 33 to one end 34 of the transformer secondary coil 35. The other terminal 36 of the coil 35 is connected to the radio receiver chassis. The other terminal 34 of the secondary coil 35 is also provided with a heater connection 37 which is connected to all of the heaters of the various tubes employed. The other terminal of each of the tube heaters is connected to the radio receiver chassis.

Thus it is obvious that when the switch arm 22 is in contact with the contact 30, current will be supplied by the secondary coil 35 to illuminate the dial light 32.

The other contact 39 of the switch 27 is connected by conductor 40 to a two position contact arm 41 which in normal position engages a contact 42 connected by conductor 43 to one terminal of a call letter projecting light 44, the other terminal of which is connected by conductor 45 to the terminal 34 of the secondary coil 35. Thus when the switch arm 22 is in the position shown in the drawings a circuit is completed from the radio receiver chassis through the conductor 25, through the switch arm 22, conductor 40, contact arm 41, contact 42, and conductor 43 to the projecting light 44, the other terminal of which is connected to the secondary coil 35 through the conductor 45. The switch 27 therefore controls the current to whichever light is to be used.

The switch arm 23 of the switch 28 is connected to the antenna coil by the conductor 47 and in the position shown in Figure 2 of the drawings connects the aerial with the rotary six position radio frequency switch 49, forming a part of the automatic tuning apparatus. In the other position of the switch 28, the antenna coil is connected through contact 51, variable condenser 50, and conductor 52, directly to the radio receiver chassis, thus by-passing the selector radio frequency switch 49.

The contact 56 of the two position switch 28 is connected to the conductor 57, which connects to one terminal of each of a series of variable condensers 59 arranged in parallel. The other terminal of each of the condensers 59 is connected to each of the segments 60 of the rotary six position radio frequency switch 49. The switch arm 61 of the switch 49 is connected by conductor 62 to the conductor 72 leading to the radio receiver chassis.

It will be seen that when the contact arm 23 is in the position illustrated, a circuit is closed through any selected segment 60 from the antenna coil to the converter tube 17. It will also be noted that each segment is equipped with a variable condenser tuning the antenna circuit to the frequency of a selected station. Thus the condensers 59 are preset for six different selected stations and the position of the rotary switch arm 61 regulates which of these stations will be received. It will also be noted that when the switch arm 23 engages the contact 56 one of the six stations will be received and the tuning condenser 50 will be by-passed. Similarly when this switch arm 23 engages contact 51, the circuit will extend through tuning condenser 50 and the pretuned condensers 59 will be by-passed.

A similar arrangement is provided for the rotary six position oscillator switch 63. The switch arm 24 of the switch 29 is connected to the coil 53 at this point 54 and is engageable with two contacts. One contact 64 is connected through tuning condenser 65 to conductor 52. The other contact 66 is connected by conductor 67 to one terminal of each of a series of preset condensers 69. The other terminal of each condenser 69 is connected to a respective one of the segments 70 of the rotary six position switch 63. The rotary contact arm 71 of the switch 63 is connected to the radio receiver chassis at 72.

Thus in one position of the switch 29 the tuning condenser 65 is in the circuit and the six position oscillator switch 63 is isolated. In the opposite position the tuning condenser 65 is isolated and the circuit extends through one of the preset condensers 69, depending upon the position of the switch arm 71.

The condensers 50 and 65 are the manual tuning condensers of the radio receiving set and are ganged for operation in unison. When the set is tuned manually, the shaft of the ganged condensers 51 and 65 is rotated by the knob G shown in Figure 1.

I have now described an apparatus which includes connected six position radio frequency and oscillator switches, which may be disconnected from the circuit when manual tuning is desired, or which may be connected thereunto when automatic tuning is desired. I will now describe the means whereby the rotary switches 49 and 63 are advanced to move the rotating contact arms 61 and 71 from one segment to the next of each switch.

The ground or chassis connections of the automatic tuning unit are connected to the receiver chassis and the tuning unit receives its power from the receiver power supply.

A conductor 74 which is connected to the positive high voltage conductor 75 of the radio receiver extends through the magnet coil 76 and connects with a contact 77 of the two way switch arm 41 normally biased by the spring 79 into engagement with the contact 42. The coil 76 is designed to draw the ratchet arm 80 toward the magnet core 81. A spring ratchet 82 on the ratchet arm 80 is engageable with a ratchet gear or wheel 83 on a vertical shaft 84, as best seen in Figure 3 of the drawings. As diagrammatically indicated at the lower right of Figure 2 and as shown in Figure 4, the shaft 84 is supported by a bearing 85 upon the receiver chassis and extends upwardly and downwardly therefrom. The six position radio frequency switch 49 and the six position oscillator switch 63 are mounted about the lower end of the shaft 84 below the line of the chassis and the rotary switch arms 61 and 71 are mounted on the shaft 84 to rotate therewith into successive engagement with the various segments making up the rotary switches. To hold the shaft in any one of six rotative positions I provide a hexagon nut or sleeve 86 on the shaft immediately above the bearing 85 which is engaged with a flat spring 87. The spring 87 tends to hold the shaft 84 in selected position.

At the upper extremity of the shaft 84 I provide a drum shaped station indicating member 89. This indicating member 89 is hollow to accommodate the projecting light 44 and is preferably opaque with the exception of the call letters of the selected group of local stations which are transparent, translucent or open. As a result the light 44 may project the call letters of a selected station through the cylindrical wall of the indicating member 89. As the drum 89 is positioned immediately back of the translucent dial 13, the call letters of the station selected are projected upon the dial 13. The drum 89 is always coordinated with the switches 49 and 63 so that the proper station is selected when the corresponding station call letters are displayed.

In order to actuate the magnet coil 76 it is necessary to move the contact arm 41 from its normal position indicated in the drawing, into its other extreme position engaging the contact 77. This is accomplished by means of a relay coil 90 which when energized, draws the contact arm 41 toward the relay coil core 91.

The rotating contact arms 61 and 71 of the rotary switches 49 and 63 are advanced from one segment to the next of each switch by the electromagnet coil 76 and its core 81 each time the relay coil 90 is energized and its core 81 attracts the contact arm 41 into engagement with the contact 77. The circuit is thus completed from the positive high voltage 75 through the conductor 74, the coil 76, contact 77, contact arm 41, conductor 40, contact 39 and switch arm 22 of the switch 27, and through the conductor 25 to the radio receiving set chassis when the contact arm 41 engages contact 77. The switch 27 connects the high voltage to the electromagnet 76 of the tuning unit as well as the low voltage to the projecting light 44 of the tuning unit through the conductor 40, depending on the position of the contact arm 41, and disconnects the electromagnet 76 of the tuning unit and the projecting light 44 from the set when the combined switches 27, 28, and 29 are in the manual tuning position.

I will now describe the means whereby the relay coil 90 is energized. The coil 90 is connected at one end to the plate 92 of the control tube 93. The other end of the coil 90 is connected by conductor 94 to the screen grid 95 of the tube 93. The screen grid 95 and conductor 94 are also connected through the resistor 96 to the metal strip 10. The conductor 94 is also connected to the resistor 97, the other terminal of which is connected directly to the cathode of the rectifier tube 98 of the radio receiver power supply by conductor 99.

The cathode 103 of the control tube 93 is connected to the radio receiving set chassis through a biasing resistor 102. The control grid 101 of the control tube 93 is connected through a grid leak resistor 100 to the set chassis. The control grid 101 is connected by the conductor 105 to the strip 11 through the resistor 106. The resistors 96 and 106 are of high resistance and completely eliminate the possibilities of a person receiving a shock when touching the metal strips 10 and 11. The resistors 96 and 106 are also included to prevent excessive positive voltage from being impressed on the control grid 101 which would shorten the life of the control tube 93. The excessive voltage mentioned above, however, would not be felt through the strips 10 and 11 by a person touching said strips if the resistors 96 and 106 were excluded.

The control grid 101 of the control tube 93 is normally biased with a negative voltage which is supplied by the resistor 102 and through the resistor 100. This allows a small amount of current to flow through the tube 93 and through the plate 92 thereof, this current passing through the coil 90 of the relay 110 which is connected thereto. When this condition exists the contact arm 41 will remain biased in its normal position by the spring 79 and will thus remain in engagement with the contact 42. A circuit previously described is thus connected from the radio receiver chassis through the switch 27, the relay switch 41 and conductor 43 to the light 44, which is supplied with current from the transformer secondary coil 35. The call letters of a station are thus displayed on the dial and the corresponding station being pretuned by the variable condensers 59 and 69 is tuned in through the radio frequency switch 49 and the oscillator switch 63.

It will now be seen that a person touching the contact strips 10 and 11 completes a circuit from the strip 10 to the strip 11, and a positive voltage is impressed on the input grid 101 of the control tube 93. This is accomplished in somewhat the same manner as in the invention of Robert B. Dome, U. S. Patent No. 2,186,825, in which the control grid of one of the receiver amplifying tubes is made positive in order to prevent radio signals from passing through the tube to the speaker of the radio receiver.

It may be noted that another action takes place within a tube controlled in this maner other than rendering the tube unresponsive to alternating currents or signal frequencies impressed on its control grid. During periods when the tube is biased beyond cut-off or the grid is positive, there is a tremendous increase in the flow of direct current from the plate to the cathode of the said tube. The increased current flow is in turn due to the fact that the control grid no longer presents an obstacle to the flow of electrons from the cathode to the plate or anode. The increased flow of direct current is utilized to operate the relay 110 in the plate circuit of the tube 93.

The above mentioned control tube is one of a type known as a power output pentode. This type was selected because of its ability to handle large amounts of power and therefore a very definite action is obtained from the relay 110. The numbers 95 and 104 shown in Figure 2 indicate the screen and suppressor grids respectively of the tube 93 and their functions are well known in the art.

The energization of the coil 90 draws the contact arm 41 of the relay 110 toward its core 91, thus breaking contact with the terminal 42 connected in the circuit of the light 44, and makes contact with the terminal 77 connected to the magnet coil 76. The energization of the magnet coil 76 moves the ratchet arm 80 toward the core of the magnet coil, rotating the ratchet 83 one-sixth of a revolution or sixty degrees, and simultaneously rotating the shaft 84 and the drum 89, nut 86 and switch arms 61 and 71 therewith.

The contact arm 41 is thus moved into engagement with contact 77 each time the strips 10 and 11 are touched. The contact arm 41 returns to normal position in engagement with contact 42 each time the hand is removed from the strips 10 and 11, thus illuminating light 44 and projecting upon the dial 13 the call letters of the station tuned in.

In the operation of my apparatus I have previously described that the switch arms 22, 23, and 24, when in one extreme position completely isolate the automatic tuning apparatus, necessitating manual tuning of the receiver. However, when automatic tuning is desired, these switch arms are in the position illustrated, whereupon a selected station is received. When the switch arms 22, 23, and 24 are turned to this latter position, the dial light 32 of the radio receiver goes out and the call letters of a selected station appear on the dial 13 of the radio, these letters being projected through the drum 89 by the light 44. When a person touches the strips 10 and 11 simultaneously, the shafts 84 are rotated one-sixth of a revolution, and during this rotation the projecting light 44 is cut off.

A suitable resistor 107 and condenser 109 are connected in series from the radio chassis to the contact 77 in order to eliminate arcing between the contact 77 and the contact arm 41, the contact arm 41 being connected to the resistor 107 through the radio chassis, the switch 27, and the conductor 40. The resistor 107 and condenser 109 are connected in this way in order to eliminate arcing between the contact 39 and arm 22 of the switch 27, which would occur if the switch 27 was actuated while the strips 10 and 11 were touched. The resistor 107 and condenser 109 also prevent noise, due to arcing, from being heard in the speaker of the receiver while the tuning unit is operating.

I have described a ratchet and electromagnet apparatus for advancing the six position selector switches 49 and 63. It will be understood that other means could be substituted therefor to accomplish this result, if it was so desired.

I am aware that various radio receivers exist with push button tuning. The present invention bears some similarity to certain apparatus actuated by push button tuning. The apparatus differs from all former constructions with which I am familiar in the manner of operating the automatic tuning apparatus.

In accordance with the patent statutes, I have described the principles of construction and operation of my radio tuning system, and while I have endeavored to set forth the best embodiment thereof, I desire to have it understood that obvious changes may be made within the scope of the following claims without departing from the spirit of my invention.

I claim:

1. A radio receiving system comprising a receiving set having a plurality of presettable means for presetting said set to receive a signal from any one of a plurality of transmitting stations, a step-by-step selecting means for selecting a desired one of said presettable means, said selecting means including a movable member, impulse actuated means operable by electrical impulses of predetermined amplitude to operate said movable member to move said selector a step for each electrical impulse received by said impulse actuated means, means including an electron discharge device having a plate connected to said impulse actuated means to actuate the same, said electron discharge device including a grid to control the flow of electrons through said plate, means for biasing said grid to selectable values of potential above and below the potential necessary to produce an electrical direct current impulse of proper amplitude to actuate said impulse actuated means, and means responsive to the electrical conductivity of the human body for actuating said grid biasing means, said last named means including a pair of electrically spaced contact members which may be simultaneously contacted manually by the human body.

2. A radio receiving system comprising a receiving set having a plurality of presettable means for presetting said set to receive a signal from any one of a plurality of transmitting stations, a step-by-step selecting means for selecting a desired one of said presettable means, said selecting means including a movable member, impulse actuated means operable by electrical impulses of predetermined amplitude to operate said movable member to move said selector a step for each electrical impulse received by said impulse actuated means, a relay controlling the impulses to said impulse actuated means, means including an electron discharge device having a plate connected in series with said relay to actuate the same, said electron discharge device including a grid to control the flow of electrons through said plate, means for biasing said grid to selectable values of potential above and below the direct current potential necessary to actuate said relay to produce an electrical impulse, and means responsive to the electrical conductivity of the human body for actuating said grid biasing means, said last named means including a pair of electrically spaced contact members which may be simultaneously contacted manually by the human body.

3. A radio receiving system comprising a receiving set having a plurality of presettable means for presetting said set to receive a signal from any one of a plurality of transmitting stations, a step-by-step selecting means for selecting a desired one of said presettable means, said selecting means including a movable member, impulse actuated means operable by electrical impulses of predetermined amplitude to operate said movable member to move said selector a step for each electrical impulse received by said impulse actuated means, means including an electron discharge device having a plate connected in series with said impulse actuated means to actuate the same, said electron discharge device including a grid to control the flow of electrons through said plate, means for biasing said grid to selectable values of potential above and below the direct current potential necessary to produce an electrical impulse to actuate said impulse actuated means, and means responsive to the electrical conductivity of the human body for actuating said grid biasing means, said last named means including a pair of electrically spaced contact strips which may be simultaneously contacted manually by the human body.

4. A radio receiving system comprising a receiving set having a plurality of presettable means for presetting said set to receive a signal from any one of a plurality of transmitting stations, a step-by-step selecting means for selecting a desired one of said presettable means, said selecting means including a movable member, impulse actuated means operable by electrical impulses of predetermined amplitude to operate said movable member to move said selector a step for each electrical impulse received by said impulse actuated means, a relay controlling the impulses of said impulse actuated means, means including an electron discharge device having a plate connected in series with said relay to actuate the same, said electron discharge device including a grid to control the flow of electrons through said plate, means for biasing said grid to selectable values of direct current potential above and below the potential necessary to actuate said relay to produce an electrical impulse, and means responsive to the electrical conductivity of the human body for actuating said grid biasing means, said last named means including a pair of electrically spaced contact strips which may be simultaneously contacted manually by the human body.

5. A radio receiving system comprising a receiving set having a plurality of presettable means for presetting said set to receive a signal from any one of a plurality of transmitting stations, a step-by-step selecting means for selecting a desired one of said presettable means, said selecting means including a movable member, impulse actuated means operable by electrical impulses of predetermined amplitude to operate said movable member to move said selector a step for each electrical impulse received by said impulse actuated means, a relay controlling the impulses of said impulse actuated means, means including an electron discharge device having a plate connected in series with said relay to actuate the same, said electron discharge device including a grid to control the flow of electrons through said plate, means for biasing said grid to selectable values of direct current potential above and below the potential necessary to actuate said relay to produce an electrical impulse, and means responsive to the electrical conductivity of the human body for actuating said grid biasing means, said last named means including a pair of electrically spaced contact strips which may be simultaneously contacted manually by the human body, said receiving set having a cabinet enclosing the same, said contact strips being mounted on the exterior surface of said cabinet.

6. A radio receiving system comprising a receiving set having a plurality of presettable means for presetting said set to receive a signal from any one of a plurality of transmitting stations, a step-by-step selecting means for selecting a desired one of said presettable means, said selecting means including a movable member, impulse actuated means operable by electrical impulses of predetermined amplitude to operate said movable member to move said selector a step for each electrical impulse received by said impulse actuated means, means including an electron discharge relay having a plate and a control electrode for controlling the flow of current through its plate circuit, and means in said plate circuit actuated by an increase of direct current through the plate circuit for actuating said impulse actuated means, and means responsive to the electrically conductive property of the human body for changing the potential on said control electrode, thereby to effect a flow of current through the electron discharge relay during the time that the last named means is manually touched to produce an impulse to actuate said impulse actuated means a step, said last named means including a pair of electrically spaced contact members which may be simultaneously contacted manually by the human body.

7. A radio receiving system comprising a receiving set having a plurality of presettable means for presetting said set to receive a signal from any one of a plurality of transmitting stations, a step-by-step selecting means for selecting a desired one of said presettable means, said selecting means including a movable member, impulse actuated means operable by electrical impulses of predetermined amplitude to operate said movable member to move said selector a step for each electrical impulse received by said impulse actuated means, a relay connected to said impulse actuated means for controlling the impulses thereto, means including an electron discharge relay having a control electrode for controlling the flow of current to said first named relay, said first named relay being connected in series with the plate of said electron discharge relay and means responsive to the electrically conductive property of the human body for changing the potential on said control electrodes, thereby to effect a flow of direct current through the plate of the electron discharge relay during the time that the last named means is manually touched to produce an impulse to actuate said first named relay, said last named means including a pair of electrically spaced contact members which may be simultaneously contacted manually by the human body.

8. A radio receiving system comprising a receiving set having a plurality of presettable means for presetting said set to receive a signal from any one of a plurality of transmitting stations, a step-by-step selecting means for selecting a desired one of said presettable means, said selecting means including a movable member, impulse actuated means operable by electrical impulses of predetermined amplitude to operate said movable member to move said selector a step for each electrical impulse received by said impulse actuated means, means including an electron discharge relay having a control electrode for controlling the flow of current to said impulse actuated means, said impulse actuated means being actuated by an increase in plate current of said electron discharge relay, and means responsive to the electrically conductive property of the human body for changing the potential on said control electrode, thereby to effect a flow of current through the electron discharge relay during the time that the last named means is manually touched to produce an impulse to actuate said impulse actuated means a step, a pair of electrically spaced contact strips forming a part of said last named means which may be simultaneously touched by a portion of the human body.

9. A radio receiving system comprising a receiving set having a plurality of presettable means for presetting said set to receive a signal from any one of a plurality of transmitting stations, a step-by-step selecting means for selecting a desired one of said presettable means, said selecting means including a movable member, impulse actuated means operable by electrical impulses of predetermined amplitude to operate said movable member to move said selector a step for each electrical impulse received by said impulse actuated means, a relay connected to said impulse actuated means for controlling the impulses thereto, means including an electron discharge relay having a control electrode for controlling the flow of current to said first named relay, said first named relay being in series with the plate of said electron discharge relay, and means responsive to the electrically conductive property of the human body for changing the potential on said control electrodes, thereby to effect an increased flow of direct current through the electron discharge relay and the plate thereof during the time that the last named means is manually touched to produce an impulse to actuate said first named relay, a pair of electrically spaced contact strips forming a part of said last named means, which may be simultaneously touched by a portion of the human body.

THOMAS EUGENE FRAUENSHUH.

REFERENCES CITED

The following references are of record in the file of this patent:

UNITED STATES PATENTS

| Number | Name | Date |
|---|---|---|
| 1,552,919 | Gauthier | Sept. 8, 1925 |
| 1,863,050 | Hotopp, Jr. | June 14, 1932 |
| 1,937,099 | Stewart | Nov. 28, 1933 |
| 1,964,449 | Carlson | June 26, 1934 |
| 2,036,999 | Bunting | Apr. 14, 1936 |
| 2,044,927 | West | June 23, 1936 |
| 2,062,259 | Thomas | Nov. 24, 1936 |
| 2,078,060 | Clement | Apr. 20, 1937 |
| 2,186,825 | Dome | Jan. 9, 1940 |
| 2,216,671 | McDonald, Jr. | Oct. 1, 1940 |
| 2,250,371 | Grimes | July 22, 1941 |
| 2,262,218 | Andrews | Nov. 11, 1941 |
| 2,296,755 | Woods | Sept. 22, 1942 |
| 2,307,329 | McDonald, Jr. | Jan. 5, 1943 |
| 2,326,737 | Andrews | Aug. 17, 1943 |
| 2,343,219 | Marholz | Feb. 29, 1944 |
| 2,357,237 | Thompson | Aug. 29, 1944 |

FOREIGN PATENTS

| Number | Country | Date |
|---|---|---|
| 332,572 | Great Britain | July 21, 1930 |